United States Patent

[11] 3,594,708

[72] Inventor Guy John Lalonde
Bethpage, N.Y.
[21] Appl. No. 804,565
[22] Filed Mar. 5, 1969
[45] Patented July 20, 1971
[73] Assignee Industrial Electronic Hardware Corp.
New York, N.Y.

[54] PRINTED CIRCUIT BOARD COAXIAL CONNECTOR
24 Claims, 5 Drawing Figs.

[52] U.S. Cl. .......... 339/176, 339/177, 339/220, 339/276
[51] Int. Cl. .......... H01r 13/34, H01r 5/08, H05k 1/07
[50] Field of Search .......... 339/17 L, 17 LC, 17 LM, 17 M, 17 N, 176 MP, 176 MF, 198, 198 G, 198.1, 198.3, 198.4, 198.41, 198.6, 217, 220, 177, 276 D, 276 T, 276 S, 206, 207, 210, 214, 219

[56] References Cited
UNITED STATES PATENTS

| | | | |
|---|---|---|---|
| 3,160,455 | 12/1964 | Mayon et al. | 339/17 L |
| 3,176,261 | 3/1965 | Greco et al. | 339/176 MP |
| 3,487,352 | 12/1969 | Putyato et al. | 339/66 |

*Primary Examiner*—James A. Leppink
*Assistant Examiner*—Lawrence J. Staab
*Attorney*—James and Franklin

ABSTRACT: A connector for use in connecting a coaxial cable or shielded wire conductor to a printed circuit board comprises a pair of contacts. One contact is adapted to be crimped about the inner signal conductor of the coaxial cable, and the other contact is adapted to be crimped to the braid or shielded wire of that cable. The two contacts are secured to an insulator by means of securing parts extending from each contact and received in spaced slots formed in the insulator.

INVENTOR
GUY JOHN LaLONDE
BY James and Franklin
ATTORNEY

INVENTOR
GUY JOHN LALONDE
BY James and Franklin
ATTORNEY

PRINTED CIRCUIT BOARD COAXIAL CONNECTOR

The present invention relates to electrical connectors, and particularly to a connector for use in connecting a coaxial cable to a printed circuit board or the like.

Printed circuit boards are in widespread use in electronic apparatus such as electronic data processing computers, in which the various circuits are formed on conducting paths and electrical components are secured at predetermined locations on the board to these paths. The circuit paths of the board which are to receive external sources of signals commonly terminate at the edge of the board and are adapted to be inserted into an edgeboard connector. That connector is usually of the type having a housing having a plurality of signal carrying connectors received in a longitudinal slot formed in the housing. The edge of the printed circuit board is inserted into the slot in a manner such that the conducting path terminations at the edge of the board are in secure electrical contact with the signal-carrying connectors. As a result of this electrical connection, the input signals are applied to the appropriate conducting sections on the printed circuit board.

For low frequency signals the conductor used to carry these signals may conveniently be a single wire carrying a single layer of insulation, and for somewhat higher frequency signals, the input signal conductor may comprise a twisted pair of such wires. However, the use of still higher frequency signals, such as high frequency pulses commonly used in the operation of computer circuits and the need for more compact and high density conductors to reduce system size has required the use of coaxial cables to connect these signals to the printed circuit board to prevent crosstalk, i.e., interference between the high frequency signals carried by adjacent conductors caused by radiation of these signals between conductors.

A coaxial cable typically comprises an inner signal conductor surrounded by a first layer of insulation around which a braid of conducting material is concentrically arranged. A second insulation layer is arranged about the braid. In most applications of coaxial cables of this type, the braid is connected to ground to minimize the unwanted transmission (crosstalk) of the signal from the inner conductor, but is possible that the braid carry a second input signal.

In the past, in the use of such coaxial cables to connect high frequency signals to edgeboard connectors, the braid had to be uncovered for a substantial distance, unwound from about the inner insulation layer and then spread to permit a portion of that inner insulation to be exposed. The inner insulation layer is then cut away to expose the inner signal conductor, and the braid is connected to one contact of the connector by means such as soldering. The unraveling of the braid and the soldering require the handling of relatively large tools in a relatively congested area and thus, the connecting of coaxial cables to edgeboard connectors has heretofore been a difficult and time-consuming operation. However, the increased data rates utilized in modern computer systems and the like has made the use of coaxial cables essential to apply signals to the various logic circuits in the system.

One of the prime advantages of the use of edgeboard connectors and printed circuit boards in large scale systems is their ability to be packaged in a relatively small volume, thereby to increase the number of circuits that can be packaged or housed in a given installation. For compatibility with this type of installation, the connection of conductors to the edgeboard connector also preferably utilizes components which take up a minimum amount of system space.

It has been proposed to provide a connector for connecting coaxial cables in which a pair of contacts is supported on an insulator block. Each contact is intended to be operatively connected to one conductor of the coaxial cable, the composite connector and conductor assembly then being applied as a unit into slots in the connector housing to form the edgeboard connector assembly. While this proposed connector design does simplify the connection of the coaxial cable to the connector contacts, the resulting construction requires the use of cold forming of parts of the plastic insulator, or hot form riveting of these parts, both operations being deleterious to the structural integrity of the connector. That connector thus tends to be structurally weak and tends to fail in an impermissibly short period, thereby reducing the reliability of the connection with the printed circuit board.

The proposed design while being an improvement over the previously known devices for connecting a coaxial cable to a printed circuit board, is also relatively difficult to assemble and presents problems with respect to maintaining the required insulation between the connector contacts and thus, between the inner conductor and the braid of the coaxial cable to which these contacts are respectively connected. Another drawback in that proposed design is that the means for retaining the assembled connector within the edgeboard connector housing is relatively fragile and presents the problem that the retaining action between the coaxial connector and the edgeboard connector housing will fail and the contacts be released from engagement with the printed circuit board.

It is a prime object of the present invention to provide an improved connector for connecting a coaxial cable to an edgeboard connector or the like.

It is a further object of the present invention to provide a connector for use with a coaxial cable in which the assembly of the overall connector with the cable is simplified, and in which there is a resulting saving in both time and assembly cost.

It is yet a further object of the present invention to provide a connector of the type described which is more sturdy in construction and provides a more secure retention and separation between the connector contacts when they are assembled to form the unitary connector assembly.

It is still another object of the present invention to provide a coaxial cable connector of the type described in which the contacts may be readily stamped from sheet metal and in which the assembly of these strips to the supporting insulator is performed in a manner which does not require riveting or hammering of the insulator material which may tend to weaken the structural integrity of the insulator.

It is yet another object of the present invention to provide a coaxial cable connector of the type described which includes an improved construction of a detenting tongue, which in turn provides for a more secure retention of the connector within the edgeboard connector housing.

It is still another object of the present invention to provide a coaxial cable connector having a higher breakdown voltage between its two contacts, which is sturdier in construction, which is more easily assembled, and which provides more secure retention with the edgeboard connector housing into which it is inserted.

To these ends, the present invention provides an improved coaxial cable connector which comprises a pair of resilient contacts each of which is integrally provided with a tubular part which is adapted to be crimped or otherwise deformed about one of the coaxially arranged conductors of a coaxial cable, that is, the inner signal conductor and the braid, in a manner effective to respectively electrically connect each of these conductors to the connector contacts. When the contacts are so connected to the coaxial cable their crimped tubular parts are substantially coaxial along the connector.

The contacts are secured to an insulator to form the unitary assembly in a manner which effectively electrically insulates the contacts from one another, and which provides secure and reliable retention of the contacts to the insulator. As a result a unitary assembly of the insulator, coaxial cable and coaxial contacts is formed which is readily arranged, handled and inserted into the edgeboard connector as a unit.

Apertures are formed in the insulator, and the contacts are provided with securing parts in the form of tabs or tongues which pass through these apertures and then bend about the insulator in a manner to securely retain both contacts to the insulator. A detenting tongue or catch is formed integrally with the insulator and extends therefrom and is adapted to engage a part of the edgeboard connector housing in a manner to securely retain the coaxial connector assembly after is has been inserted therein for engagement with the edge of a printed circuit board.

The contact having a tubular part crimped about the braid may also comprise a second tubular part adapted to be crimped about the outer jacket of the coaxial cable to provide improved retention of the cable and the connector. Recesses may be formed adjacent the apertures in the insulator to receive the bent portions of the contact tongues after they are passed through the apertures and bent over. As a result, these contact parts lie substantially flush with the surface of the insulator, and the connector assembly is essentially planar in form and can be readily inserted into a relatively narrow slot formed in the edgeboard connector housing. A great many of such connectors may be installed in a relatively short edgeboard connector.

Both contacts are secured to the same surface of the insulator, that is, the tongues of both contacts pass through the same face of the insulator body and are bent over the same reverse face. The contacts do not overlap so that the insulation between the contacts is improved and the maximum breakdown voltage of the connector is increased.

To the accomplishment of the above, and to such other objects as may hereinafter appear, the present invention relates to coaxial connector as defined in the appended claims and as described in this specification, taken together with the accompanying drawings in which:

Figures 1, 2:
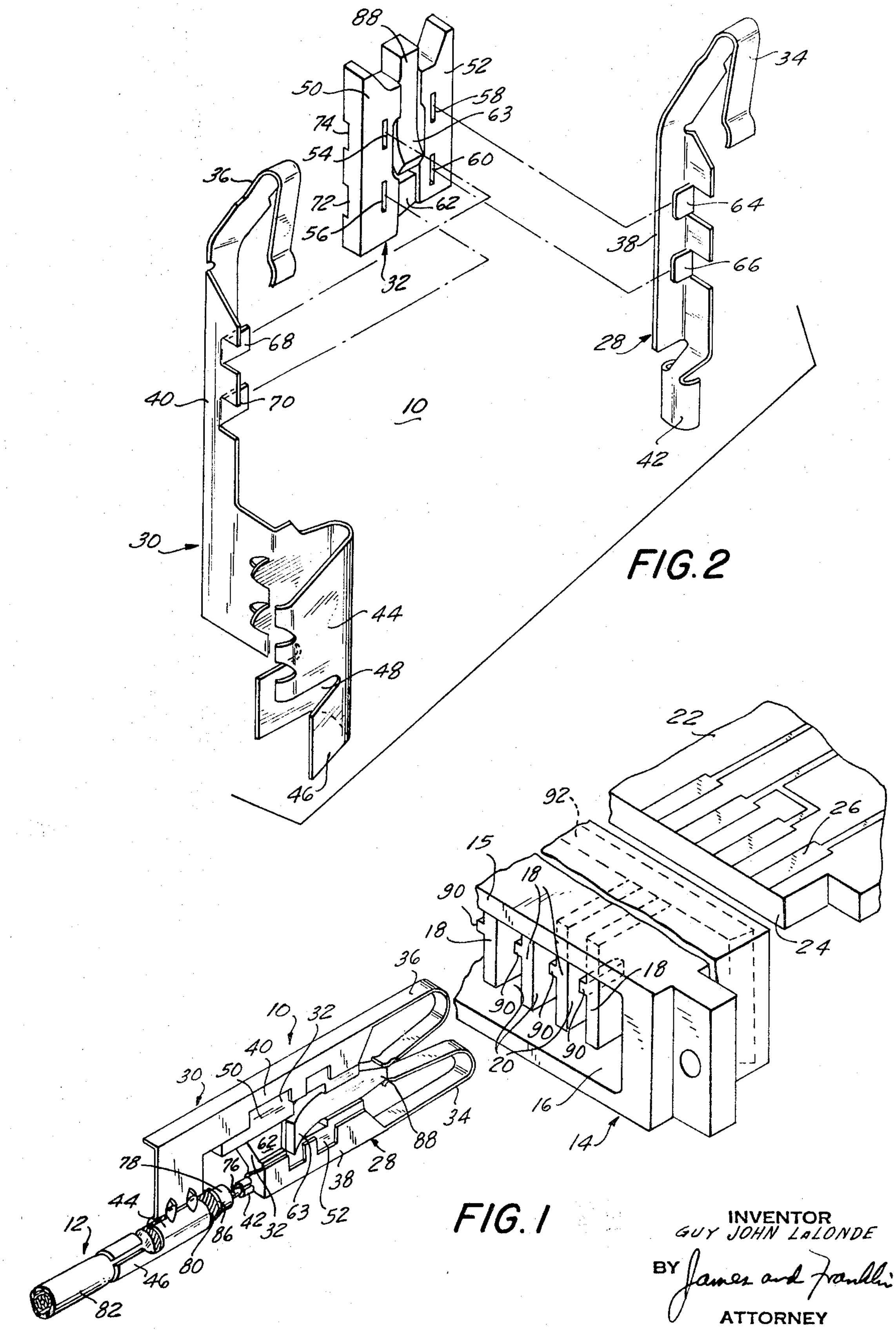
FIG. 1 is a perspective view of the coaxial connector of this invention illustrating the manner in which the connector is secured to a coaxial cable and the manner in which it is inserted into an edgeboard connector housing to form an edgeboard connector assembly.
FIG. 2 is an exploded view in perspective illustrating the contacts and the insulator body of the coaxial connector of FIG. 1.

Referring to the drawings, and particularly to FIG. 1, the double-contact coaxial connector generally designated 10 is electrically connected to a coaxial cable 12 and is about to be inserted into an edgeborad connector housing 14. Connector housing 14 comprises a block 15 of material such as plastic, in which a longitudinal slot 16 is formed. A series of substantially vertical walls 18 define a plurality of vertical channels 20 transversely arranged along slot 16. In a typical edgeboard connector assembly, a plurality of coaxial connectors 10, each connected to a different coaxial cable 12, is inserted into each of channels 20 in connector housing 14.

A printed circuit board 22 has an edge portion 24 which is adapted to be inserted into slot 16 from the rear or opposing surface of connector housing 14 in a manner such that one of a plurality of conducting paths 26, which terminate at the upper and lower surfaces of the edge portion 24, make electrical contact with one of the contacts of connector 10.

Connector 10 comprises a first contact generally designated 28 and a second contact generally designated 30, separated by and interconnected with an insulator generally designated 32, these parts being shown separated in the exploded view of FIG. 2. Contacts 28 and 30 may be conveniently stamped from sheet metal and respectively comprise a resilient spring contact 34 and 36 and a connecting longitudinal strip 38 and 40 integral with their respective spring contacts. Strip 38 terminates at its other end in an arcuate tube or sleeve 42 while strip 40 of contact 30 terminates in an arcuate tube or sleeve 44 which has a second tube or sleeve 46 integrally formed therewith and separated therefrom by a notch 48.

The insulator 32 comprises a generally flat, rectangular plate of insulating material such as plastic. Insulator 32 includes two spaced side longitudinal segments 50 and 52, segment 50 being slightly longer in length than segment 52. Each segment has a pair of colinear rectangular apertures such as 54 and 56 in segment 50, and 58 and 60 in segment 52. A reduced thickness part 62 defining a longitudinal channel is formed intermediate segments 50 and 52 and a detenting tongue 63 is formed in that channel integral with insulator 32 and slants upwardly away from one upper surface of insulator 32 towards its lower end as shown in FIG. 2.

A pair of tongues or tabs 64 and 66 are formed along strip 38 of contact 28 at a location intermediate contact 34 and sleeve 42. A similar pair of tongues 68 and 70 are formed along strip 40 of contact 30. The unitary coaxial connector 10 is formed by inserting tongues 64 and 66 of contact 28 into and through apertures 58 and 60 respectively, and tongues 68 and 70 of contact 30 into and through apertures 54 and 56 respectively. After the tongues 64—70 pass through their respective slots, they are bent at their lower ends around the under side of insulator 32 by any suitable means to provide secure retention of the two contacts 28 and 30 with respect to the insulator 32.

Figure 3:
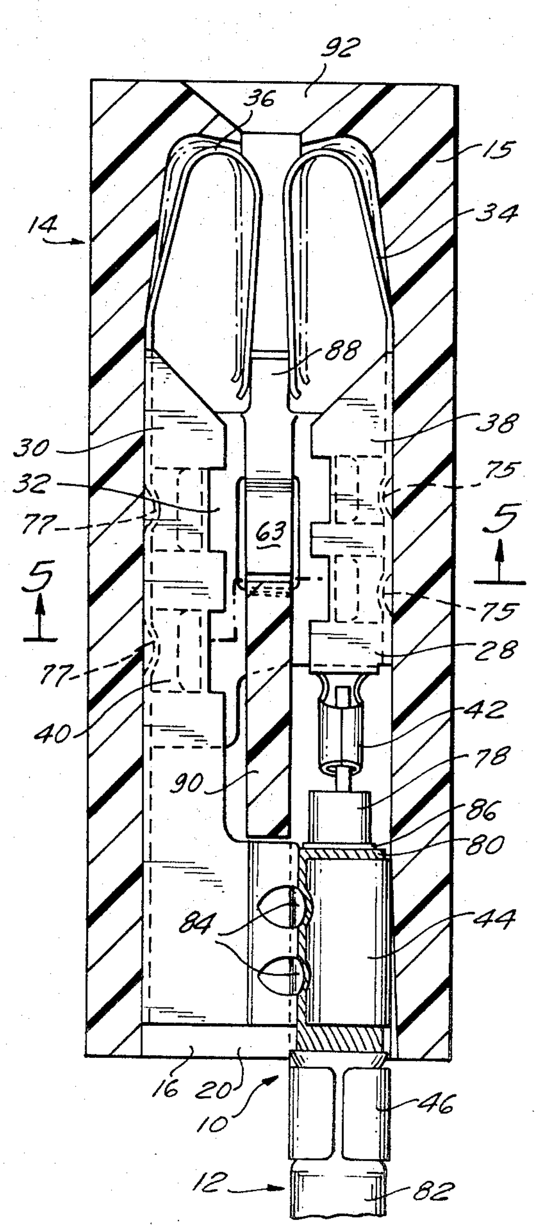
FIG. 3 is a cross-sectional view taken through an assembled edgeboard connector illustrating the coaxial connector of the present invention therein.

A pair of recesses are formed at the underside of insulator 32 adjacent the slots 48—54 on either side of the body (only recesses 72 and 74 being visible in FIG. 2) and receive the bent over portions of the tongues. These bent portions of the tongues thus lie flush with the under surface of insulator 32 after the contacts 28 and 30 are assembled onto the insulator 32 to form the unitary coaxial connector 10. The longitudinal end walls of contact strips 38 and 40 may be indented as at 75 and 77 respectively (FIG. 3) and an edge of these strips may be bent over the corners of insulator 32 as at 79 and 81 to obtain a more secure retention between the contacts 28, 30 and insulator 32.

A typical coaxial cable 12 as shown in FIG. 1 comprises an inner signal conductor 76 surrounded by a first concentric insulation layer 78, which in turn is enclosed by a conducting braid 80. Braid 80 in turn, is similarly surrounded by a second or outer insulator jacket 82. A separately wound textile thread (not shown) may be contained within insulation layer 78 to provide air insulation inside layer 78. At the end of cable 12 the inner insulation layer 78, the braid 80 and the outer insulation jacket 82 are stripped away by an appropriate amount to expose a length of signal conductor 76 and braid 80.

To assemble connector 10 and coaxial 12, the sleeve 42 of contact 28 is crimped about the exposed inner conductor 76 of cable 12 in a manner to establish a secure retention and electrical connection between them. To the rear of sleeve 42, sleeve 44 of contact 30 is similarly crimped about the exposed portion of braid 80 to again provide secure mechanical connection between contact 30 and braid 80. That latter crimping may include indentations as at 84 (FIG. 3) to improve that retention, care being taken to avoid the crushing of the textile thread in insulation layer 78. To this end a ferrule 86 may be inserted between braid 80 and insulation layer 78 to provide protection for that thread. The sleeve 46 is then crimped about the outer insulation jacket 82 to provide relief against strain.

Thus, contact 34 is electrically connected through strip 38 and sleeve 42 to the inner signal conductor 76 of cable 12, and contact 36 is electrically connected to braid 80 through strip 40 and sleeve 44. A post 88 integral with and extending longitudinally from insulator 32 projects between resilient contacts 34 and 36 to space these contacts from one another. Contacts 28 and 30 are both arranged on the same surface of insulator 32 and there is no overlapping between them on opposite sides of insulator 32. As a result the electrical insulation between these contacts is maintained at a high magnitude. The sleeves 42, 44 and 46 are all substantially coaxially arranged about the coaxial elements of cable 12 to which they are respectively crimped.

Figure 4:
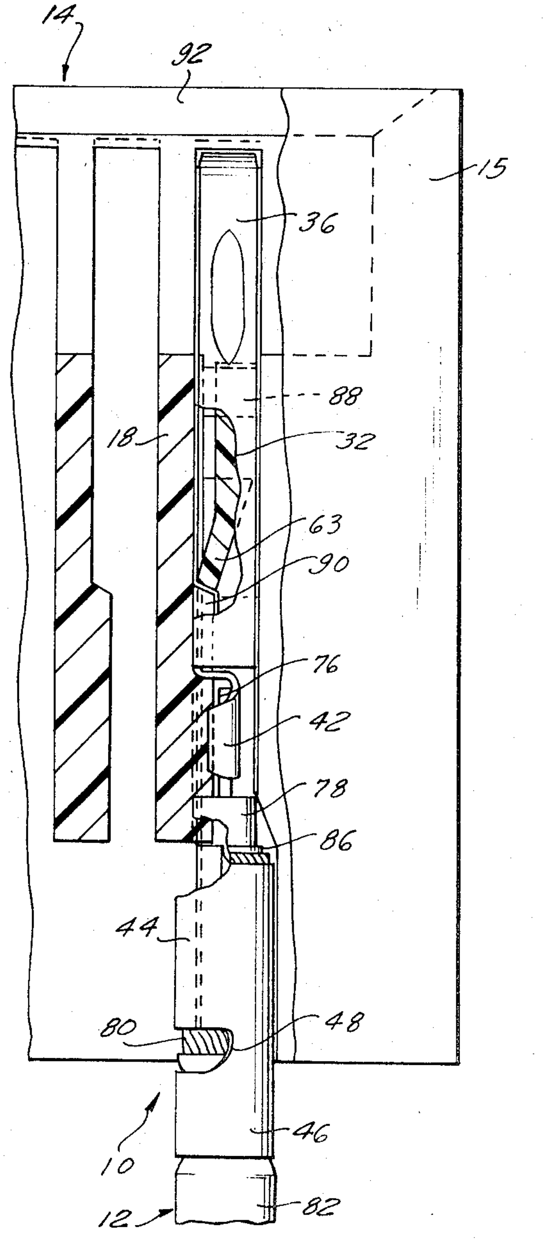
FIG. 4 is a fragmentary cross-sectional view taken across a plane transverse to that of the section of FIG. 3.
Figure 5:
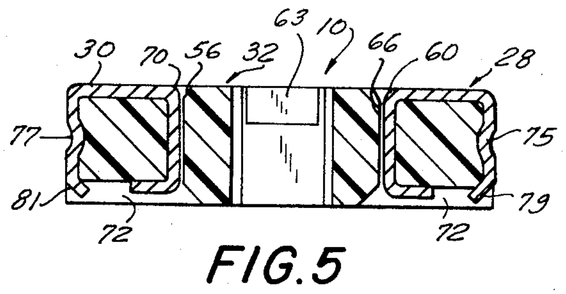
FIG. 5 is a cross-sectional view taken along the line 5—5 of FIG. 3.

The overall assembly of coaxial connector 10 and cable 12 formed in this manner is inserted into one of the channels 20 of edgeboard connector housing 14. A projection 90 is formed on walls 18 defining these vertical channels. Upon the insertion of the connector 10 into channel 20, detenting tongue 63 slides over block 90 and once past it, springs back and engages the block 90 (FIG. 4), thereby to securely retain the connector 10 and the cable 12 within the edgeboard connector housing 14. At this time block 90 is received within the channel defined by the reduced thickness part 62 of insulator 32. The printed circuit board 22 is later inserted into the connector housing 14 through a slot 92 formed through the other surface of connector 14 and passes between the resilient contacts 34 and 36. As a result, contact 34 and thus inner conductor 76 of cable 12 is connected to a conducting path on board 22, and contact 36 and thus braid 80 is connected to a conducting path on the other surface of board 22. The insertion of board 22 between contacts 36 and 34 is effective to move these contacts lightly away from one another so that the contacts 34 and 36 engage board 22 with a resilient force to effect a secure electrical contact between the contacts and the board conducting paths, and thus, between the coaxial cable conductors and these conducting paths.

The coaxial connector of the present invention thus provides a sturdy and reliable means for connecting a coaxial cable to a printed circuit board. That connector is sturdy in construction and takes up a minimal amount of space so that a great number of such connectors and thus a great number of coaxial cables can be connected at one time to a printed circuit board through a relatively small edgeboard connector which receives the coaxial connectors and the printed circuit board. The assembly of the coaxial cable to the connector of this invention is performed prior to the insertion of the coaxial connector into the edgeboard connector, and thus, greatly facilitates the initial assembly of the coaxial connector, and the insertion of that connector along with the coaxial cable into the edgeboard connector housing. The novel manner in which the double contacts of the coaxial connector are assembled with the insulator provides for improved separation between these contacts and thus, increases the maximum voltage breakdown between the contacts. The connector assembly is sturdy and reliable and insures reliable connection between the contacts and the inner conductor and braid of the coaxial cable. The provision of the detent tongue integral with the insulator provides a more reliable retention of the coaxial connector within the edgeboard connector after the former is inserted therein. The contacts are quickly and readily assembled with the insulator by the use of simple crimping tools or fixture which are easily operated by workers having a minimal amount of skill.

The assembly of the thus assembled connector to a coaxial cable is also inexpensive and quickly achieved and results in increased efficiency and reduced costs of the assembly of the connector and the cable. As a result the use of coaxial cables in an edgeboard connector to provide input high frequency signals to a printed circuit board is achieved in a practical and reliable manner, while still maintaining the high packaging density desired in using printed circuit boards.

While only a single embodiment of the present invention has been herein specifically disclosed, it will be apparent that many variations can be made thereto without departing from the spirit and scope of the invention.

I claim:

1. A connector for terminating a coaxial cable of the type having a central conductor and an outer annular conductor disposed about said central conductor, said connector comprising a first member having a first contact, first deformable means adapted to be deformed and secured about said central conductor, and first conducting means extending between and operatively connected to said first contact and said first deformable means and having first securing means projecting therefrom; a second member having a second contact, second deformable means arranged rearwardly and substantially coaxial to said first deformable means and adapted to be deformed and secured about said outer conductor, second conducting means extending between and operatively connected to said second contact and said second deformable means and having second securing means projecting therefrom; and insulator means interposed between said first and second members and having in the interposed portion thereof first and second spaced slots therein respectively receiving said first and second securing means and effective to electrically insulate said first and second members and to retain said members in a unitary connector assembly, said members and insulating means comprising a unitary individually manipulatable assembly adapted to be manipulated as a unit with said cable and to be received in and detached from a separate connector housing.

2. The connector of claim 1, in which said insulator means comprises a generally flat plate of insulator material, said members each being formed of a relatively thin strip of sheet metal bent respectively about the opposing edges of said plate, to insert said securing means into said slots.

3. The connector of claim 2, in which recesses are formed in said block adjacent said slots for receiving portions of said members bent over the surface of said block, thereby to form a substantially flat unitary connector assembly.

4. The connector of claim 3, in which said first contact, said first deformable means, said first connecting means, and said first securing means are all integrally formed out of a single strip of conducting material, said second contact, said second deformable means, said second connecting means, and said second securing means all being integrally formed out of a second strip of conducting material.

5. The connector of claim 1, in which said first contact, said first deformable means, said first connecting means, and said first securing means are all integrally formed out of a single strip of conducting material, said second contact, said second deformable means, said second connecting means, and said second securing means all being integrally formed out of a second strip of conducting material.

6. The connector of claim 1, in which said first and second contacts each comprise a resilient bent part, said insulator means comprising means effective to define a space between said parts.

7. In combination with the connector of claim 1, an insulator housing, said insulator means further comprising a sloping detent located intermediate said slots and extending beyond the surface of said insulator means adapted to engage a portion of the interior of said insulator housing, thereby to latch said connector therein.

8. The connector of claim 7, in which said first and second contacts each comprises a resilient bent part, said insulator means comprising means effective to define a space between said parts, said first and second contacts lying in a substantially common plane.

9. The combination of claim 7, in which said housing is generally rectangular and has a longitudinal slot formed therein, means arranged in said longitudinal slot for defining a plurality of closely adjacent slots extending transverse to said longitudinal slot, and abutment means disposed in said transverse slots defining said interior portion.

10. An edgeboard connector comprising a generally rectangular housing having a longitudinal slot formed therein, and means arranged in said longitudinal slot for defining a plurality of closely adjacent slots extending transverse to said longitudinal slot, each of said transverse slots receiving a connector as defined in claim 1.

11. The edgeboard connector of claim 10 further comprising a plurality of walls defining said adjacent slots, each of said walls having an abutment part extending therefrom, said insulator means comprising a sloping detent part extending beyond the surface thereof and passing over and engaging said abutment part, thereby to latch said connector therein.

12. An edgeboard connector comprising a generally rectangular housing having a longitudinal slot formed therein, and means arranged in said longitudinal slot for defining a plurality of closely adjacent slots extending transverse to said longitudinal slot, one or more of said transverse slots receiving a connector as defined in claim 2.

13. The edgeboard connector of claim 12 further comprising a plurality of walls defining said adjacent slots, each of said walls having an abutment part extending therefrom, said insulator means comprising a sloping detent part extending beyond the surface thereof and passing over and engaging said abutment part, thereby to latch said connector therein.

14. A connector for terminating a coaxial cable of the type having a central conductor and an outer annular conductor disposed about said central conductor, said connector comprising a first member having a first contact, first deformable means adapted to be deformed and secured about said central conductor, and first conducting means extending between and operatively connected to said first contact and said first deformable means and having first securing means projecting therefrom; a second member having a second contact, second deformable means arranged rearwardly and substantially coaxial to said first deformable means and adapted to be deformed and secured about said outer conductor, second conducting means extending between and operatively connected to said second contact and said second deformable means and having second securing means projecting therefrom; and insulator means interposed between said first and second members, said insulator means comprising a generally flat piece of insulator material, said members each being formed of a relatively thin strip of sheet metal having portions bent respectively about the opposing edges of said plate and being crimped into secure engagement with said plate.

15. A connector for terminating a coaxial cable of the type having a central conductor and an outer annular conductor disposed about said central conductor, said connector comprising a first member having a first contact, first deformable means adapted to be deformed and secured about said central conductor, and first conducting means extending between and operatively connected to said first contact and said first deformable means and having first securing means projecting therefrom; a second member having a second contact, second deformable means arranged rearwardly and substantially coaxial to said first deformable means and adapted to be deformed and secured about said outer conductor, second conducting means extending between and operatively connected to said second contact and said second deformable means and having second securing means projecting therefrom; and insulator means interposed between said first and second members and having first and second spaced slots therein respectively receiving said first and second securing means and effective to electrically insulate said first and second members and to retain said members in a unitary connector assembly, in which said insulator means comprises a generally flat plate of insulator material, said members each being formed of a relatively thin strip of sheet metal bent respectively about the opposing edges of said plate, to insert said securing means into said slots.

16. The connector of claim 15, in which recesses are formed in said block adjacent said slots for receiving portions of said members bent over the surface of said block, thereby to form a substantially flat unitary connector assembly.

17. The connector of claim 16, in which said first contact, said first deformable means, said first connecting means, and said first securing means are all integrally formed out of a single strip of conducting material, said second contact, said second deformable means, said second connecting means, and said second securing means all being integrally formed out of a second strip of conducting material.

18. A connector for terminating a coaxial cable of the type having a central conductor and an outer annular conductor disposed about said central conductor, said connector comprising a first member having a first contact, first deformable means adapted to be deformed and secured about said central conductor, and first conducting means extending between and operatively connected to said first contact and said first deformable means and having first securing means projecting therefrom; a second member having a second contact, second deformable means arranged rearwardly and substantially coaxial to said first deformable means and adapted to be deformed and secured about said outer conductor, second conducting means extending between and operatively connected to said second contact and said second deformable means and having second securing means projecting therefrom; and insulator means interposed between said first and second members and having first and second spaced slots therein respectively receiving said first and second securing means and effective to electrically insulate said first and second members and to retain said members in a unitary connector assembly, in which said first contact, said first deformable means, said first connecting means, and said first securing means are all integrally formed out of a single strip of conducting material, said second contact, said deformable means, said second connecting means, and said second securing means all being integrally formed out of a second strip of conducting material.

19. A connector for terminating a coaxial cable of the type having a central conductor and an outer annular conductor disposed about said central conductor, said connector comprising a first member having a first contact, first deformable means adapted to be deformed and secured about said central conductor, and first securing means projecting therefrom; a second member having a second contact, second deformable means arranged rearwardly and substantially coaxial to said first deformable means and adapted to be deformed and secured about said outer conductor, second conducting means extending between and operatively connected to said second contact and said second deformable means and having second securing means projecting therefrom; and insulator means interposed between said first and second members and having first and second spaced slots therein respectively receiving said first and second securing means and effective to electrically insulate said first and second members and to retain said members in a unitary connector assembly, and in combination therewith, an insulator housing, said insulator means further comprising a sloping detent located intermediate said slots and extending beyond the surface of said insulator means adapted to engage a portion of the interior of said insulator housing, thereby to latch said connector therein.

20. The connector of claim 19, in which said first and second contacts each comprise a resilient bent part, said insulator means comprising means effective to define a space between said parts, said first and second contacts lying in a substantially common plane.

21. The combination of claim 19, in which said housing is generally rectangular and has a longitudinal slot formed therein, means arranged in said longitudinal slot for defining a plurality of closely adjacent slots extending transverse to said longitudinal slot, and abutment means disposed in said transverse slots defining said interior portion.

22. An edgeboard connector comprising a generally rectangular housing having a longitudinal slot formed therein, and means arranged in said longitudinal slot for defining a plurality of closely adjacent slots extending transverse to said longitudinal slot, each of said transverse slots receiving a connector as defined in claim 15, and further comprising a plurality of walls defining said adjacent slots, each of said walls having an abutment part extending therefrom, said insulator means comprising a sloping detent part extending beyond the surface thereof and passing over and engaging said abutment part, thereby to latch said connector therein.

23. An edgeboard connector comprising a generally rectangular housing having a longitudinal slot formed therein, and means arranged in said longitudinal slot for defining a plurality of closely adjacent slots extending transverse to said longitudinal slot, one or more of said transverse slots receiving a connector as defined in claim 15.

24. The edgeboard connector of claim 23 further comprising a plurality of walls defining said adjacent slots, each of said walls having an abutment part extending therefrom, said insulator means comprising a sloping detent part extending beyond the surface thereof and passing over and engaging said abutment part, thereby to latch said connector therein.